(12) United States Patent
Regni et al.

(10) Patent No.: US 12,124,417 B2
(45) Date of Patent: Oct. 22, 2024

(54) FAST AND EFFICIENT STORAGE SYSTEM IMPLEMENTED WITH MULTIPLE CLOUD SERVICES

(71) Applicant: SCALITY, S.A., Paris (FR)

(72) Inventors: Giorgio Regni, Albany, CA (US);
Vianney Rancurel, Sausalito, CA (US);
Nicolas Trangez, Antwerp (BE)

(73) Assignee: Scality, S.A., Paris (FR)

( * ) Notice: Subject to any disclaimer, the term of this patent is extended or adjusted under 35 U.S.C. 154(b) by 0 days.

(21) Appl. No.: 17/156,261

(22) Filed: Jan. 22, 2021

(65) Prior Publication Data
US 2022/0237151 A1 Jul. 28, 2022

(51) Int. Cl.
*G06F 16/182* (2019.01)
*G06F 16/11* (2019.01)
(Continued)

(52) U.S. Cl.
CPC ........ *G06F 16/1824* (2019.01); *G06F 16/128* (2019.01); *G06F 16/164* (2019.01); *G06F 16/1873* (2019.01)

(58) Field of Classification Search
CPC .. G06F 16/1824; G06F 16/128; G06F 16/164; G06F 16/1873; G06F 3/061;
(Continued)

(56) References Cited

U.S. PATENT DOCUMENTS 5,442,784 A   8/1995 Powers
5,564,113 A   10/1996 Bergen
(Continued)

FOREIGN PATENT DOCUMENTS

CN   111158602 A   5/2020
EP   0458564 A2   11/1991
(Continued)

OTHER PUBLICATIONS

Mao, Bo, Suzhen Wu, and Hong Jiang. "Improving storage availability in cloud-of-clouds with hybrid redundant data distribution." (2015) IEEE International Parallel and Distributed Processing Symposium. IEEE. (Year: 2015).*
(Continued)

*Primary Examiner* — Vaishali Shah
(74) *Attorney, Agent, or Firm* — Compass IP Law PC

(57) ABSTRACT

A method for implementing a storage system is described. The method includes accepting a filepath from a user that specifies a file. The method includes forming a primary key for a representation of the file. The method includes applying the primary key to a database cloud service to obtain a representation of the file. The representation of the file includes an inode for the file's meta data. The method includes using the inode for the file's meta data to obtain the file's meta data from a high performance object cloud storage service. The file's meta data points to information within the high performance object cloud storage service for accessing the file's stripes. The method includes accessing the information within the high performance object cloud storage service to obtain an object ID for a stripe within the file. The method includes using the object ID to access the stripe from a low performance object cloud storage service.

20 Claims, 12 Drawing Sheets

(51) Int. Cl.
  *G06F 16/16* (2019.01)
  *G06F 16/18* (2019.01)
(58) Field of Classification Search
  CPC ........ G06F 3/0635; G06F 3/064; G06F 3/065;
         G06F 3/067; G06F 16/182; G06F 11/14;
         G06F 11/16; H04L 67/1097; H04L 67/01
  See application file for complete search history.

(56) References Cited

U.S. PATENT DOCUMENTS

| | | | |
|---|---|---|---|
| 5,806,066 | A | 9/1998 | Golshani |
| 5,857,197 | A | 1/1999 | Mullins |
| 5,937,402 | A | 8/1999 | Pandit |
| 6,085,296 | A | 7/2000 | Karkhanis et al. |
| 6,304,869 | B1 | 10/2001 | Moore |
| 6,519,679 | B2 | 2/2003 | Devireddy |
| 6,832,248 | B1 | 12/2004 | Byrnes |
| 7,051,033 | B2 | 5/2006 | Agarwal et al. |
| 7,155,466 | B2 | 12/2006 | Rodriguez |
| 7,167,915 | B2 | 1/2007 | Bendich |
| 7,478,263 | B1 | 1/2009 | Kownacki et al. |
| 7,500,020 | B1 | 3/2009 | Kabra et al. |
| 7,647,329 | B1 | 1/2010 | Fischman et al. |
| 7,783,666 | B1 | 8/2010 | Zhuge |
| 7,805,409 | B2 | 9/2010 | Manczak |
| 7,849,112 | B2 | 12/2010 | Mane |
| 7,913,053 | B1 | 3/2011 | Newland |
| 8,024,442 | B1 | 9/2011 | Roussos et al. |
| 8,055,622 | B1 | 11/2011 | Botes et al. |
| 8,200,706 | B1 | 6/2012 | Sim-Tang |
| 8,250,035 | B1 | 8/2012 | Tang et al. |
| 8,260,792 | B1 | 9/2012 | Hsu |
| 8,352,431 | B1 | 1/2013 | Protopopov et al. |
| 8,429,444 | B2 | 4/2013 | Rancurel et al. |
| 8,775,428 | B2 | 7/2014 | Birdwell et al. |
| 8,825,602 | B1 | 9/2014 | Desai et al. |
| 8,880,474 | B2 | 11/2014 | Mason |
| 8,931,038 | B2 * | 1/2015 | Pulier ..................... H04L 12/66 |
| | | | 726/1 |
| 9,152,648 | B2 | 10/2015 | Regni et al. |
| 9,280,591 | B1 | 3/2016 | Kharatishvili et al. |
| 9,311,135 | B2 | 4/2016 | Regni et al. |
| 9,524,302 | B2 | 12/2016 | Regni et al. |
| 9,588,977 | B1 | 3/2017 | Wang et al. |
| 9,632,828 | B1 | 4/2017 | Mehta et al. |
| 9,652,334 | B2 | 5/2017 | Junqueira et al. |
| 9,959,280 | B1 | 5/2018 | Whitehead et al. |
| 10,248,682 | B2 | 4/2019 | Regni et al. |
| 10,261,960 | B2 | 4/2019 | Regni et al. |
| 10,366,070 | B2 | 7/2019 | Regni et al. |
| 10,754,878 | B2 | 8/2020 | Regni et al. |
| 10,853,316 | B1 * | 12/2020 | Bole ..................... G06F 16/152 |
| 2003/0159007 | A1 | 8/2003 | Sawdon et al. |
| 2004/0088301 | A1 | 5/2004 | Mahalingam et al. |
| 2005/0065986 | A1 | 3/2005 | Bixby et al. |
| 2005/0203819 | A1 | 9/2005 | Rogers et al. |
| 2006/0106878 | A1 | 5/2006 | Shitomi et al. |
| 2007/0174333 | A1 | 7/2007 | Lee et al. |
| 2007/0260830 | A1 | 11/2007 | Faibish et al. |
| 2008/0040565 | A1 | 2/2008 | Rozas et al. |
| 2008/0059541 | A1 * | 3/2008 | Fachan ................. G06F 16/174 |
| 2008/0183973 | A1 | 7/2008 | Aguilera et al. |
| 2009/0077327 | A1 | 3/2009 | Hara |
| 2009/0112880 | A1 | 4/2009 | Oliveira et al. |
| 2009/0112908 | A1 | 4/2009 | Wintel et al. |
| 2009/0144342 | A1 | 6/2009 | Sudhakar |
| 2009/0150364 | A1 | 6/2009 | Melander et al. |
| 2009/0254693 | A1 | 10/2009 | Karamanolis et al. |
| 2010/0082538 | A1 | 4/2010 | Rentsch et al. |
| 2010/0191884 | A1 | 7/2010 | Holenstein et al. |
| 2010/0199040 | A1 | 8/2010 | Schnapp et al. |
| 2011/0016353 | A1 * | 1/2011 | Mikesell ............. G06F 16/1834 |
| | | | 707/E17.014 |
| 2011/0106778 | A1 | 5/2011 | Chan et al. |
| 2011/0191485 | A1 | 8/2011 | Umbehocker |
| 2011/0208909 | A1 | 8/2011 | Kawaguchi |
| 2011/0302583 | A1 | 12/2011 | Abadi et al. |
| 2012/0059963 | A1 | 3/2012 | Pasupuleti et al. |
| 2012/0130949 | A1 | 5/2012 | Picken et al. |
| 2012/0191760 | A1 | 7/2012 | Kaufman |
| 2012/0296872 | A1 | 11/2012 | Frost et al. |
| 2013/0036089 | A1 | 2/2013 | Lucas |
| 2013/0080559 | A1 | 3/2013 | Rao et al. |
| 2013/0086303 | A1 | 4/2013 | Ludwig et al. |
| 2013/0110778 | A1 * | 5/2013 | Taylor ................. G06F 11/1435 |
| | | | 707/624 |
| 2013/0159339 | A1 | 6/2013 | Thomsen et al. |
| 2013/0204948 | A1 | 8/2013 | Zeyliger et al. |
| 2013/0332484 | A1 | 12/2013 | Gajic |
| 2013/0339407 | A1 | 12/2013 | Sharpe et al. |
| 2014/0181039 | A1 | 6/2014 | Harrison |
| 2014/0181130 | A1 | 6/2014 | Davis |
| 2014/0258239 | A1 | 9/2014 | Amlekar et al. |
| 2014/0278807 | A1 * | 9/2014 | Bohacek ............ G06Q 30/0206 |
| | | | 705/7.35 |
| 2014/0280187 | A1 | 9/2014 | Molaro |
| 2014/0324785 | A1 | 10/2014 | Gupta et al. |
| 2014/0344401 | A1 | 11/2014 | Varney et al. |
| 2015/0032783 | A1 | 1/2015 | Sareen |
| 2015/0046415 | A1 | 2/2015 | Crossley et al. |
| 2015/0254272 | A1 | 9/2015 | Regni et al. |
| 2015/0280959 | A1 * | 10/2015 | Vincent ................. H04L 67/141 |
| | | | 709/203 |
| 2015/0379009 | A1 | 12/2015 | Reddy et al. |
| 2016/0004718 | A1 | 1/2016 | Lin et al. |
| 2016/0004720 | A1 | 1/2016 | Tabaaloute et al. |
| 2016/0246834 | A1 | 8/2016 | Regni et al. |
| 2018/0121454 | A1 | 5/2018 | Kushwah et al. |
| 2019/0073395 | A1 * | 3/2019 | Regni .................... G06F 16/951 |
| 2019/0087431 | A1 * | 3/2019 | Qiu ....................... G06F 16/188 |
| 2020/0065293 | A1 | 2/2020 | Wideman et al. |
| 2020/0099687 | A1 | 3/2020 | Parekh et al. |
| 2020/0351345 | A1 | 11/2020 | Bansod et al. |
| 2021/0397581 | A1 | 12/2021 | Regni et al. |
| 2022/0058094 | A1 * | 2/2022 | Gunturu ................. G06F 3/0641 |

FOREIGN PATENT DOCUMENTS

| | | |
|---|---|---|
| WO | 2005024552 A3 | 11/2006 |
| WO | 2013032909 A1 | 3/2013 |
| WO | 2015134677 A1 | 9/2015 |
| WO | 2015134678 A1 | 9/2015 |
| WO | 2015134680 A1 | 9/2015 |
| WO | 2015140728 A1 | 9/2015 |

OTHER PUBLICATIONS

Aguilera, Marcos K., et al., A Practical Scalable Distributed B-Tree, PVLDB '08, Aug. 23-28, 2008, pp. 598-609, Auckland, New Zealand.
Bonwick, Jeff, et al., The Zettabyte File System, 2003, 13 pages.
Bonwick, Jeff, et al., ZFS The Last Word in File Systems, SDC Storage Developer Conference, SNIA Santa Clara, 2009, 44 pages.
Ceph Developers "Ceph Documentation Release dev Ceph Developers", Aug. 8, 2012, Section 1.
Ceph Developers "Ceph Documentation Release dev Ceph Developers", Aug. 8, 2012, Section 2.
Chandy, K. Mani, et al., Distributed Snapshots: Determining Global States of Distributed Systems, ACM Transactions on Computer Systems, Feb. 1985, pp. 63-75, vol. 3, No. 1. University of Texas at Austin and Stanford Research Institute.
Chang, Fay, et al., "Bigtable: A Distributed Storage System for Structured Data", ACM Transactions on Computer Systems, vol. 26, No. 2, Article 4, Jun. 2008, pp. 4:1-4:26.
Cohen, et al ., "Version Management In Gypsy", Software Engineering Notes, ACM, New York, New York, vol. 13, No. 5, Nov. 1, 1998, pp. 201-215.
Dabek, Frank et al., Wide-Area Cooperative Storage with CFS, SOSP '01, Oct. 21-24, 2001, 14 pages, MIT Laboratory for Computer Science, Banff, Canada.

(56) References Cited

OTHER PUBLICATIONS

EMC ISILON SnapShotIQ, Datasheet, 2012, 2 pages.
Henson, Val, et al., Double the Metadata, Double the Fun: A COW-like Approach to File System Consistency, 2004, 5 pages, IBM, Inc.
Kara, Jan, Ext4, btrfs, and others, SUSE Labs, 2008, 13 pages, Czech Republic.
Kasampalis, "Write Based File Systems Performance Analysis and Implementation", 2010, Technical University of Denmark, Department of Informatics, Kongens Lyngby, Denmark, 94 pages.
Kasampalis, Sakis, Chapter 3 "Copy On Write based file systems" from Copy On Write Based File Systems Performance Analysis and Implementation, 2010, pp. 17-22, Technical University of Denmark, Department of Informatics, Kongens Lyngby, Denmark.
Klosowski, Przemek, B-Tree File System BTRFS, DCLUG, Aug. 2009, 14 pages.
Leonard, Ozgur Can, et al., "The Design and Implementation of Elastic Quotas: A System for Flexible File System Management", Columbia Univ. Computer Science Technical Reports, CUCS-014-02, .COPYRGT. 2002, pp. 1-14.
MacCormick, John., et al., Boxwood: Abstractions as the Foundation for Storage Infrastructure, 2004, 16 pages, Microsoft Research Silicon Valley.
Mesnier, Mike Ganger, G.R., and Erik Riedel "Storage Area networking—Object-Based Storage", IEEE Communications Magazine, IEEE Service Center, Piscataway, US, vol. 41, No. 8, Aug. 1, 2003, pp. 84-90.
Ooi, Beng Chin, et al., "Index nesting—An Efficient Approach To Indexing In Object-Oriented Databases", The VLDB, Journal, The International Journal on Very Large Data Bases, Aug. 1, 1996, pp. 215-228.
Peterson, Zachary N. J., et al., Ext3cow: A Time-Shifting File System for Regulatory Compliance, ACM Transactions on Storage, vol. 1, Issue 2, May 2005, 21 pages.
Pilarski, Slawomir, et al., Checkpointing for Distributed Databases: Starting from the Basics, IEEE Transactions on Parallel and Distributed Systems, Sep. 1992, vol. 3, No. 5, pp. 602-610, School of Computing Science, Simon Fraser University, Burnaby, B.C. Canada.
Ren, Kai et al., "TABLEFS: Enhancing Metadata Efficiency in the Local File System", Technical Report of Jan. 31, 2013, 2013 USENIX Annual Technical Conference, pp. 145-156 (12 pages total).
Rodeh, Ohad, B-trees, Shadowing, and Clones, 2007, 51 pages, IBM Haifa Research Labs.
Weil, Sage A.:, CEPH: Reliable, Scalable, and High-Performance Distributed Storage, University of Carolina Dissertation, Dec. 31, 2007, Chapter 4, pp. 1-32.
Shaull, Ross, et al., Skippy: A New Snapshot Indexing Method for Time Travel in a Storage Manager, SIGMOD 08, Jun. 9-12, 2008, pp. 637-648, Department of Computer Science, Brandeis University, Waltham, Massachusetts.
SnapLock® Compliance and Snaplock Enterprise Software, Datasheet, 2006, 2 pages.
Stender, Jan et al., "Loosely time—Synchronized Snapshots In Object-Based File Systems", Performance Computing and Communications Conference (IPCCC), 2010 IEEE 29th International, IEEE, Dec. 9, 2010. pp. 188-197, Sections 4 and 5.
The Microsoft Computer Dictionary, 5th Edition, Microsoft Press, Redmond, WA, .COPYRGT. 2002, pp. 12, 141, 145 and 372.

The Non-Volatile Systems Laboratory NV-Heaps: Fast and Safe Persistent Objects, http://nvsl.ucsd.edu/nvuheaps/, 2 pgs., Sep. 1, 2011.
Wu, Sai, et al., Efficient B-tree Based Indexing for Cloud Data Processing, Proceedings of the VLDB Endowment, 2010, 12 pages, vol. 3, No. 1, School of Computing, National University of Singapore, Singapore.
Xu, Pengzhi, et al., "Enabling Cloud Storage to Support Traditional Applications", ChinaGrid 2010, Guangzhou, China, Jul. 16-18, 2010, pp. 167-172.
Yuan, Yulai, et al., "VDB-MR: MapReduce-based distributed data integration using virtual database", Future Generation Computer Systems, vol. 26, Issue 8, Oct. 2010, pp. 1418-1425.
Weil, Sage A.:,(Continued) CEPH: Reliable, Scalable, and High-Performance Distributed Storage, University of Carolina Dissertation, Dec. 31, 2007, Chapter 4, pp. 33-81.
Hyogi Sim et al., 'An Integrated Indexing and Search Service for Distributed File Systems', IEEE Transactions on Parallel and Distributed Systems, Oct. 2020, vol. 31, pp. 2375-2391, pp. 2375-2388.
International Search Report and Written Opinion for PCT Patent Application No. PCT/US22/11709, dated Apr. 27, 2022, 8 pages.
Cindy Eisner et al., 'A Methodology for Formal Design of Hardware Control With Application to Cache Coherence Protocols', In: DAC '00: Proceedings of the 37th Annual Design Automation Conference, Jun. 1, 2000, pp. 724-729.
Fig. 1 only of the U.S. Appl. No. 17/156,261, filed Jan. 22, 2021.
Starling on p. 4, paragraphs [0010] through paragraph [0015] only of the U.S. Appl. No. 17/156,261, filed Jan. 22, 2021, pp. 4-5.
Stefanov et al. "Iris: A Scalable Cloud File System with Efficient Integrity Checks". ACSA' 12 Dec. 3-7, 2012, Orlando Florida USA (Year: 2012).
Thain et al. "The Case for Sparse Files" University of Wisconsin, Computer Sciences Department, Cisco Distinguished Graduate Fellowship and a Lawrence Landweber NCR 2003 (Year: 2003).
Thekkath et al. "Frangipani: A Scalable Distributed File System" Systems Research Center, Digital Equipment Corporation, 130 Lytton Ave. Palo Alto, CA 9430, 1997 (Year: 1997).
Final Office Action for U.S. Appl. No. 17/350,998, dated Feb. 22, 2023, 24 pages.
First Office Action for U.S. Appl. No. 17/350,998, dated Jul. 20, 2022, 23 pages.
International Search Report and Written Opinion for PCT Patent Application No. PCT/US21/38097, dated Oct. 13, 2021, 10 pages.
Extended European Search Report for Patent Application No. 21827010.6, Mailed Nov. 15, 2023, 13 pages.
Extended European Search Report for Patent Application No. 22742982.6, Mailed Nov. 17, 2023, 8 pages.
Jeff Inman et al.: "File Systems MarFS, a Near-POSIX Interface to Cloud Objects", Usenix, The Advanced Computing Systems Association, Feb. 26, 2019 Feb. 26, 2019), pp. 1-6, XP061062284, Retrieved from the Internet: URL:http://www.usenix.org/system/files/login/articles/login_spring17 _07 _inman.pdf, [retrieved on Feb. 26, 2019].
Second Office Action for U.S. Appl. No. 17/350,998, Mailed Sep. 12, 2023, 22 pages.
Second Final Office Action for U.S. Appl. No. 17/350,998, Mailed Apr. 26, 2024, 26 pages.
U.S. Appl. No. 63/041,895, Filed Jun. 20, 2020, 23 pages.

* cited by examiner

FAST AND EFFICIENT STORAGE SYSTEM IMPLEMENTED WITH MULTIPLE CLOUD SERVICES

FIELD OF INVENTION

The field of invention pertains generally to the computing sciences, and, more specifically, to a fast and efficient storage system implemented with multiple cloud services.

BACKGROUND

With the emergence of big data, low latency access to large volumes of information is becoming an increasingly important parameter of the performance and/or capability of an application that processes or otherwise uses large volumes of information. Moreover, cloud services have come into the mainstream that allow networked access to high performance computing component resources such as CPU and main memory resources (execute engine), database resources and/or storage resources.

FIGURES

A better understanding of the present invention can be obtained from the following detailed description in conjunction with the following drawings, in which.

DETAILED DESCRIPTION

1. Introduction

Figure 1:
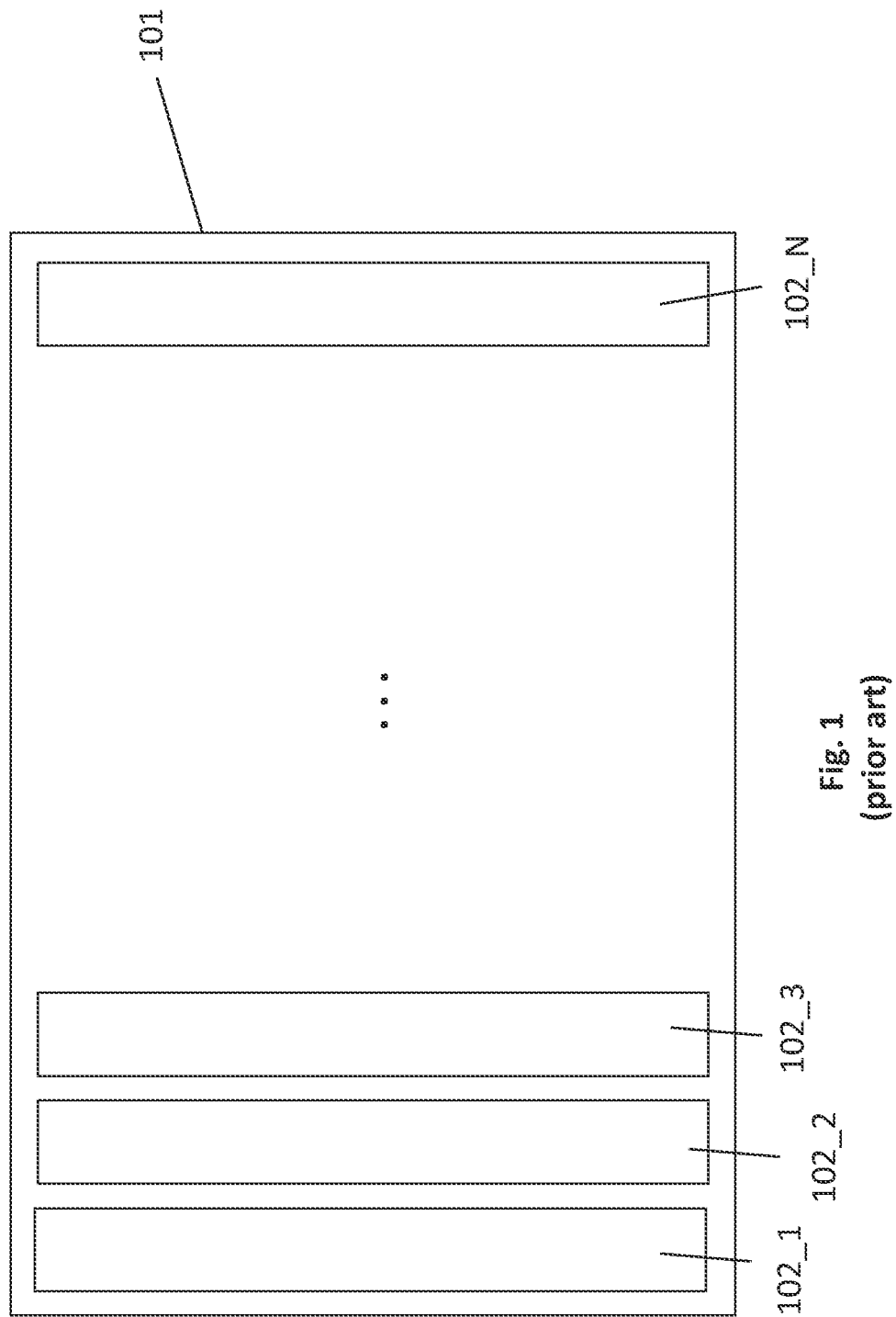
FIG. 1 shows a sparse file.

Referring to FIG. 1, as is known in the art, a sparse file can be a single file 101 whose storage resources are broken down into smaller units of storage, referred to as "stripes" 102_1 through 102_N. Individual stripes 102_1, 102_2, ... 102_N within the file 101 are uniquely identified by an offset. Sparse files have been used to make more efficient use of physical storage resources. For example, stripes that are actually written to contain their respective data in physical storage, while, stripes that have not been written to do not consume any (or very little) physical storage resources. As such, the size of the overall file 101 is reduced as compared to a traditional file (in which physical storage resources sufficient to fill the entire file had to be allocated or otherwise reserved).

Thin provisioning generally refers to storage systems whose file structures are designed to consume less storage space than what their users believe has been allocated to them by breaking down units of storage (e.g., files) into smaller pieces (e.g., stripes) that can be uniquely accessed, written to and read from. If a smaller piece is not actually written to, it consumes little/no physical storage space thereby conserving physical storage resources.

For the sake of illustrative convenience, the following discussion will pertain mainly to sparse file system implementations. However, the reader should understand the discussion herein is also applicable to thin provisioned systems other than sparse file systems.

In the case of high performance (e.g., data center) environments certain users may desire advanced storage system functions that run "on top of" the file system such as snapshots (which preserves the state of the storage system at a specific point in time).

Additionally, it is often desirable that certain meta data be tracked for the folders and files within a sparse file system. For example, some indication of the folder's/file's type of content (e.g., text, image, etc.), size, time of last access, time elapsed since last access, time of last write, whether the folder/file is read-only, etc. is tracked. Here, e.g., each time a folder/file is accessed or updated (written to), its meta data is typically updated.

Finally, different types of cloud services are readily available to those who implement or use high performance storage systems (such as data center administrators). A cloud service provider typically provides some kind of computing component (e.g., CPU processing power, storage, etc.) that is accessible through a network such as the Internet. Here, the different types of cloud services that are commonly available can exhibit different kinds of performance and/or cost tradeoffs with respect to their role/usage within a sparse file storage system.

2. Storage System Embodiments

Figure 2:
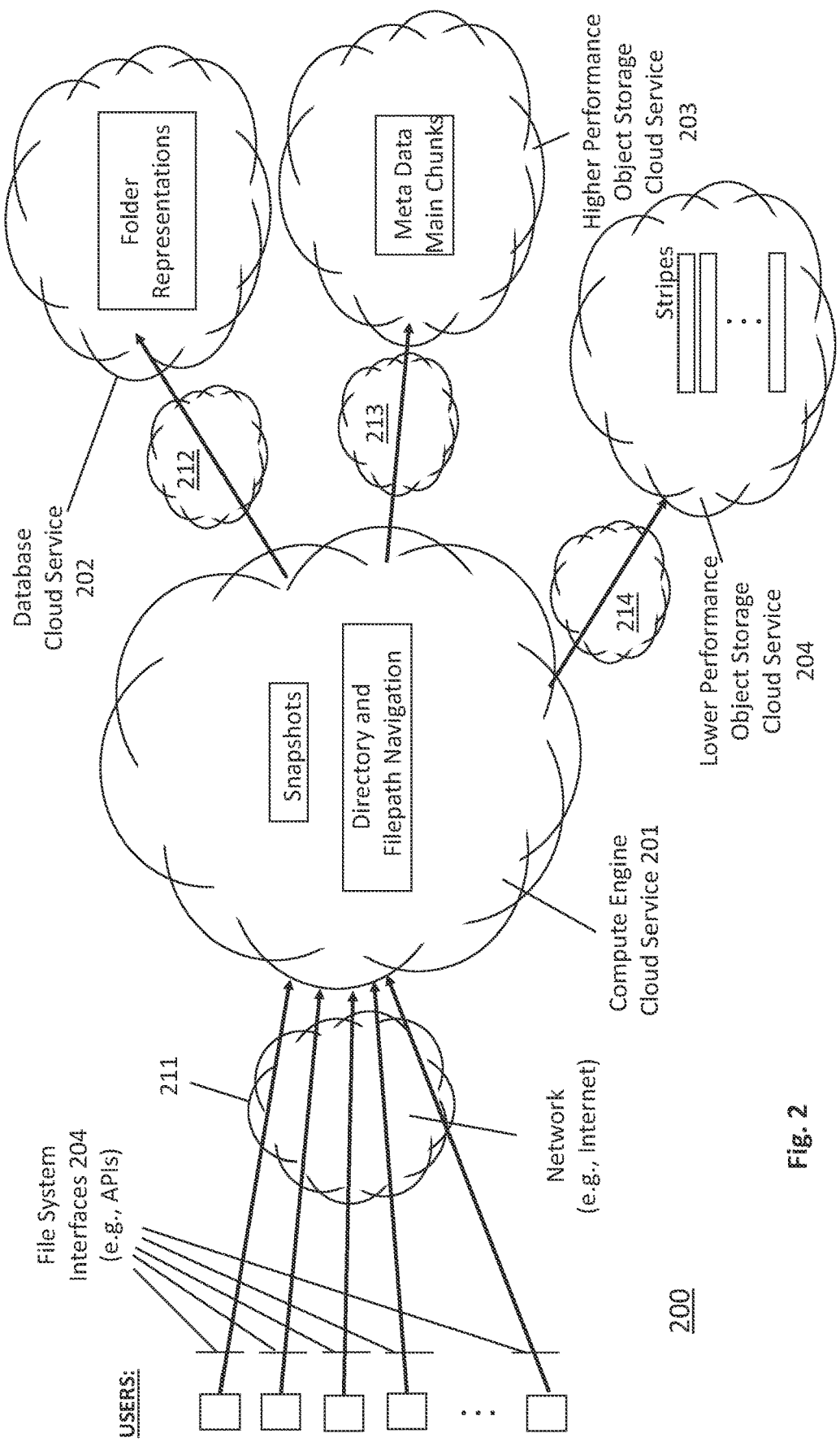
FIG. 2 shows a storage system that uses different types of cloud services.

FIG. 2 shows a new sparse file storage system architecture 200 that uses different kinds of cloud services 201, 202, 203, 204 to strike an optimized balance between the associated tradeoffs of the cloud services 201, 202, 203, 204 and the role they play in the overall sparse file storage system 200.

In the particular example shown in FIG. 2, the three different kinds of cloud services 201, 202, 203, 204 include: 1) an "execution" or "compute engine" cloud service 201 that is used as a front end to receive user requests for the storage system, comprehend/keep the storage system's respective directory or other structured/hierarchical organization of, e.g., folders and files, and, navigate through the same; 2) a database cloud service 202 that is used to keep representations of the storage system's folders and files; 3) a higher performance object storage cloud service 203 having fast access times, meta data (e.g., either or both of user defined and system defined) that stores meta information for the system's folders and files (referred to hereafter as meta data) and versioning capability to support snapshots (as described further below); and, 4) a lower performance object storage cloud service 204 having, e.g., lower access times than the higher performance object storage cloud service 203 that stores individual stripes as units of stored data (stripes are uniquely call-able in the lower performance cloud storage service 204).

Here, the first cloud service 201 is implemented with a scalable compute engine cloud service. As is known in the art, a compute engine cloud service essentially dispatches or otherwise allocates central processing unit (CPU) compute power to users of the cloud service 201. Examples include Amazon Elastic Compute Cloud (Amazon EC2), the Google Cloud Compute Engine and the compute services of Microsoft's Azure web services platform.

Some or all of these services may dispatch one or more virtual machines or containers to their respective users where, e.g., each virtual machine/container is assigned to a particular user thread, request, function call, etc. Here, the allocation of a virtual machine or container typically corresponds to the allocation of some amount of underlying CPU resource (e.g., software thread, hardware thread) to the user. The amount of allocated CPU resource can be maintained quasi-permanently for a particular user or can be dynamically adjusted up or down based on user need or overall demand being placed on the service 201.

Regardless, because of the ability of the allocated CPU resources to quickly execute complex software logic, a compute engine service 201 is the better form of cloud service for the handling of potentially large and/or bursty numbers of user requests and their navigation through the storage system's organizational hierarchy (e.g., directory) because such functions typically require fast processing of complicated software logic.

Here, in various embodiments, the compute engine service 201 is able to service requests received from users of the storage system (e.g., client application software programs, client computers, etc.) that have been provided with interfaces 204 to one or more specific types of file systems (e.g., NFSv3, NFSv4, SMB2, SMB3, FUSE, CDMI, etc.). Each interface is implemented, e.g., as an application program interface (API) that provides a user with a set of invokable commands and corresponding syntax, and their returns (collectively referred to as "protocols"), that are defined for the particular type of file system being presented. In one embodiment, instances of interfaces execute on the user side and the compute engine service 201 receives user requests from these interfaces.

The compute engine 201 also maintains an understanding of the organization of a particular storage system. Here, for example, file systems use a filepath to identify a particular stored item. If a user is presented a file system interface 204, the compute engine 201 maintains and comprehends the storage system's organization of folders and files so that any filepath specified by the user can be resolved, e.g., to a particular stripe in a particular file in a particular folder.

In various embodiments, the second cloud service 202 is implemented as a database cloud service such as any of Amazon Aurora, Amazon DynamoDB and Amazon RDS offered by Amazon; Cloud SQL offered by Google; Azure SQL Database and/or Azure Cosmos DB offered by Microsoft. Other possible cloud database services include MongoDB, FoundationDB and CouchDB. A database includes a tree-like structures (e.g., a B– tree, a B+ tree, or a log structured merge (LSM) tree) at its front end which allows sought for items to be accessed very quickly (a specified item can be accessed after only a few nodal hops through the tree). In essence, each node of the tree can spawn many branches to a large set of next lower children nodes. "Leaf nodes" exist at the lowest nodal layer and contain the items being stored by the database.

In various embodiments, as mentioned above, the database cloud service 202 is used to store representations of the storage system's folders and files which can be implemented, e.g., as pages or documents (eXtensive Markup Language (XML) pages, or JSON)). Here, again, because the tree structure at the head of the database is able to quickly access information, low-latency access to a representation of any folder or file can be readily achieved.

To the extent that a user keeps its "customer data" in a file within a folder, such data is not physically kept in a folder representation within the second cloud service 202 database. Rather, the folder representation only contains a small amount of information that is used by the storage system to fetch the folder's meta data and implement the snapshot function.

According to one embodiment, the contents of a file or folder representation include: 1) a pointer to or other kind of identifier, referred to as an "inode", for the file's/folder's meta data that is kept in the third cloud service 203; 2) the file/folder type (e.g., sparse for files and directory, regular, special for folders); 3) a snapshot number; and, 4) a tombstone flag. The purpose of each of these items will be made more clear in the following discussion.

The third cloud service is a cloud storage service 203. Here, unlike the compute engine cloud service 201 (which is optimized for logic execution) and the database cloud service 202 (which is optimized for fast access to file/folder representations), the third cloud service 203 is optimized for high performance storage.

Here, the optimization for high performance storage can be exemplified by the high performance object storage system 203 having faster access times (lower latencies) than the lower performance object storage service 204. Moreover, in various embodiments, the high performance object storage service 203 supports versioning while the lower performance object storage service 204 does not support versioning. Additionally, the high performance storage service 203 may exhibit costs that are more expensive than the lower performance object storage service 204.

Faster access times can be achieved, for example, with faster underlying storage technologies (e.g., flash memory instead of solid state disk drives). Versioning is the ability to keep a history of different versions of a same folder or file. For example, if a folder or file A is changed twice over time, the folder/file can be said to have three different versions over time (A, A' and A"). A storage system having versioning capability is able to keep all three versions of the folder/file even though the most recent version of the folde/filer (A") is the active/current version of the folder/file.

In various embodiments, the higher performance cloud storage service 203 is implemented with a high performance cloud object storage service. Examples include Azure Premium Blob Storage from Microsoft or similar high performance object storage extensions from other vendors (e.g., a "premium" Amazon Simple Storage Service (Amazon S3) or Google Cloud Storage account), or a high performance object storage system built as described in U.S. Pat. No. 9,524,302 assigned to Scality, S. A. of Paris, France (and particularly as described in Section 3.4.ii with respect to implementation of sparse files), hereinafter referred to as '302 patent, and which is hereby incorporated by reference.

As is known in the art, in the case of object storage systems, units of stored information ("objects") are identified with unique identifiers ("object IDs"). Thus, whereas a traditional file system identifies a targeted stored item with a path that flows through a directory hierarchy ("filepath") to the item, by contrast, in the case of object storage systems, targeted stored items are identified with a unique ID for the object (that can take sometimes the appearance of a path but which, in fact, is only a flat name/ID).

According to various embodiments of the system of FIG. 2, the higher performance object storage system 203 is used to store the meta data for the storage system's folders and files. Here, each individual instance of meta data for any folder or file is stored as a separate object, having a unique object ID, in the higher performance object storage system 203. The content of each such object can include one or more pages or documents (eXtensive Markup Language (XML) pages, or JSON) that contain the corresponding meta data.

Thus, in various embodiments, the inode for a folder or file that is obtained from the folder's/file's representation in the database cloud service 202 is used as the object ID to obtain the folder's unit of meta data (referred to as a "main chunk") in the high performance object storage service 203.

In other embodiments, rather than being directly used as the object ID, the inode is used to construct or generate the object ID (e.g., the object ID is a field in a larger object ID structure, a hash of the inode is taken to generate the object ID, etc.). For ease of discussion, the following description assumes the inode is directly used as the object ID for the object containing the folder's meta data.

Regardless, the processing of any particular request includes quickly accessing the targeted folder's/file's representation from the database cloud service 202 and then using the inode object ID found within the folder/file representation to access the folder's/file's "main chunk" in the high performance object storage cloud service 203 (where, the main chunk contains the folder's/file's meta data). Meta data for a folder/file is commonly updated each time the folder/file is accessed.

A main chunk in the higher performance object storage service 203 should have its inode registered (within) at least one folder representation in the database service 202. If folders are to be shared or accessible through more than one directory path, then the inode for a single main chunk can be registered with multiple folder representation instances in the database service 202.

In various embodiments the main chunk includes the following meta-data (or "attributes") for a folder/file: 1) uid (user ID (which, e.g., can be a large corporate user who is using the entire infrastructure as a cloud storage service)); 2) gid (group ID (e.g., multiple users can belong to a same group)); 3) atime (last access time in reading); 4) ctime (last modification of attributes); 5) mtime (last modification of content or attribute); 6) perms (permission such as unix permissions); 7) ACLS (extended permissions); 7) xattr (user defined attributes); 8) nlink (hardlink reference count management).

If only a file is to be accessed as a smallest unit of access (no striping), the file's content is kept in the lower performance object storage service 204, and, the inode/object ID for the content is found in the main chunk of the folder that contains the file.

In the case of sparse files, in various embodiments, each stripe also has its own inode/object ID which allows individual access for each stripe on a stripe by stripe basis. The inodes/object IDs for the stripes are stored in the higher performance cloud service 203 and are linked with the meta data for the file that the stripes are components of. The actual content of the stripes are physically kept in the lower performance object storage cloud service 204. Thus, the object IDs for the stripes are applied to the lower performance object storage cloud service 204 to actually access the stripes.

In various implementations spares files are implemented as described in the '302 patent. As described in the '302 patent, each sparse file has an associated hierarchy of meta data pages. For example, the top or root of the hierarchy is a page of pointers that each point to a separate next, lower page in the hierarchy. Each next lower intermediate page points contains pointers to next lower pages such that the hierarchy fans out akin to B tree. The lowest layer of pages (leaf pages) contain inodes/object IDs for the individual stripes which, as mentioned above, are kept in the lower performance object storage system 204.

In an embodiment, the contents of a main chunk (and sparse file page hierarchy) are mutable within the higher performance storage system 203 so that the corresponding meta data (and/or sparse file hierarchy) can be modified. In order to take snapshots of the storage system, as explained in more detail further below, in various embodiments, the higher performance object system 203 also supports versioning of main chunks (and sparse file page hierarchies).

In an embodiment, files and stripes that are stored in the lower performance object storage service 204 are immutable meaning they cannot be modified. However, such files and stripes can be soft deleted meaning they can be marked/flagged as "deleted" or "not present" and their content is not immediately removed or written over but are or removed/written over later on (e.g., the lower performance object storage system 204 periodically cleans the system of objects marked for deletion or non presence). In essence, a soft deleted object/stripe physically remains in the storage system after it has been "deleted" (users are thereafter presented with a view that does not include the deleted stripe/object). Here, the immutable and soft delete characteristics of the files and stripes allows for an effective form of versioning of the files and stripes which, as described in more detail further below, can be used to support snapshots of the larger storage system.

In other embodiments, the lower performance object storage system 204 can implement versioning and/or the higher performance object storage system 203 is an immutable storage system with soft deletes (to ultimately effect deletion at least from a user perspective) and effectively implement versioning.

Notably, storage systems other than object storage systems (e.g., traditional file system(s)) can be used for either or both of the higher performance storage system 203 and lower performance storage system 204.

As described above, each of the cloud services 201, 202, 203, 204 are commercially available cloud services. In various other embodiments one or more of the cloud services 201, 202, 203, 204 is private (a cloud service is more generally an arrangement of computing resources (e.g., CPU execution/computation, database, storage) that can be invoked/used via request over a network that is coupled to the arrangement). As such, referring to FIG. 2, networks 201, 202, 203, 204 can each be composed of the Internet, one or more private network(s), or some combination thereof.

3. Embodiment of Stripe Access Method

Figure 3A:
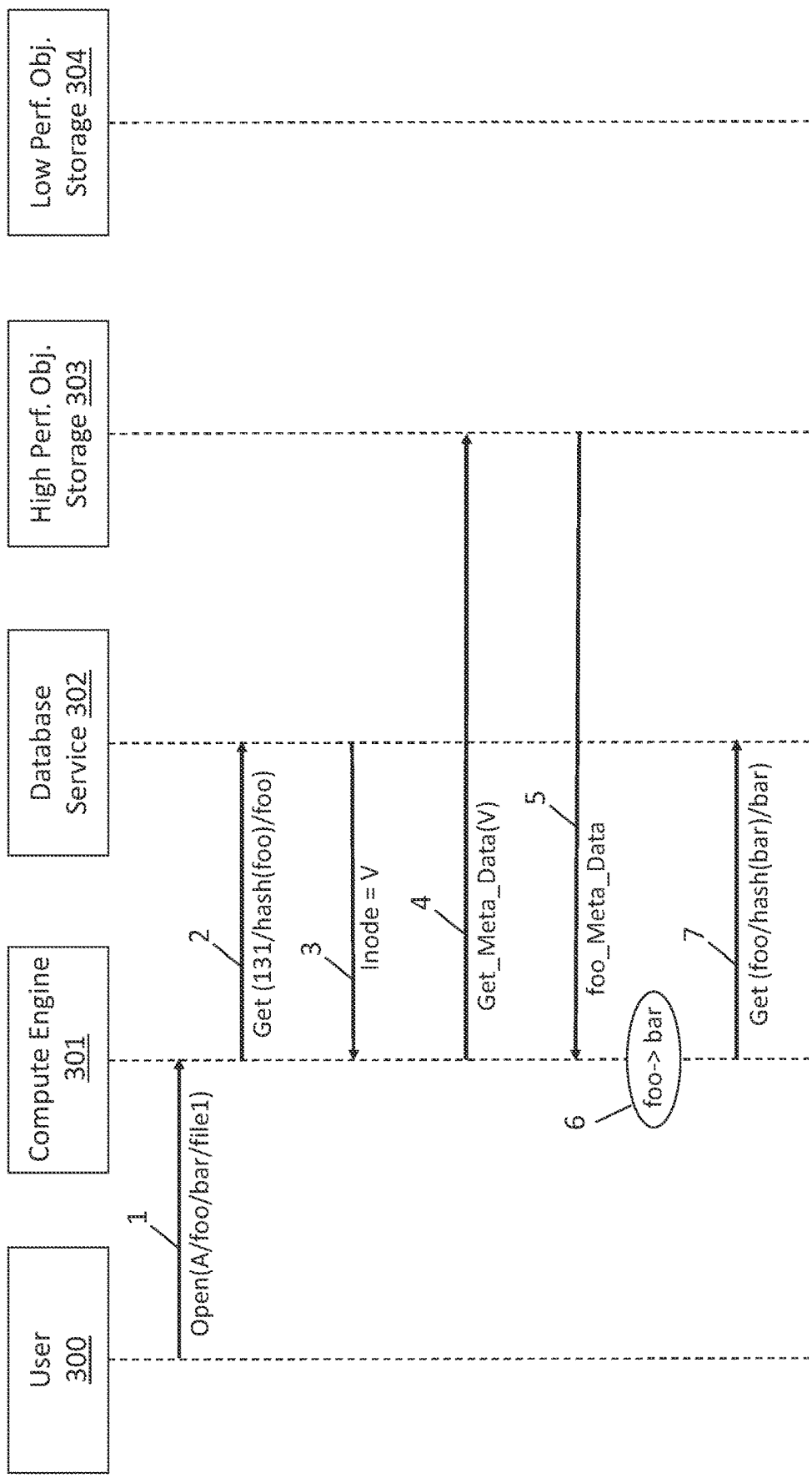
FIGS. 3a, 3b and 3c shows a method of accessing of a file with the storage system of FIG. 2.
Figure 3B:
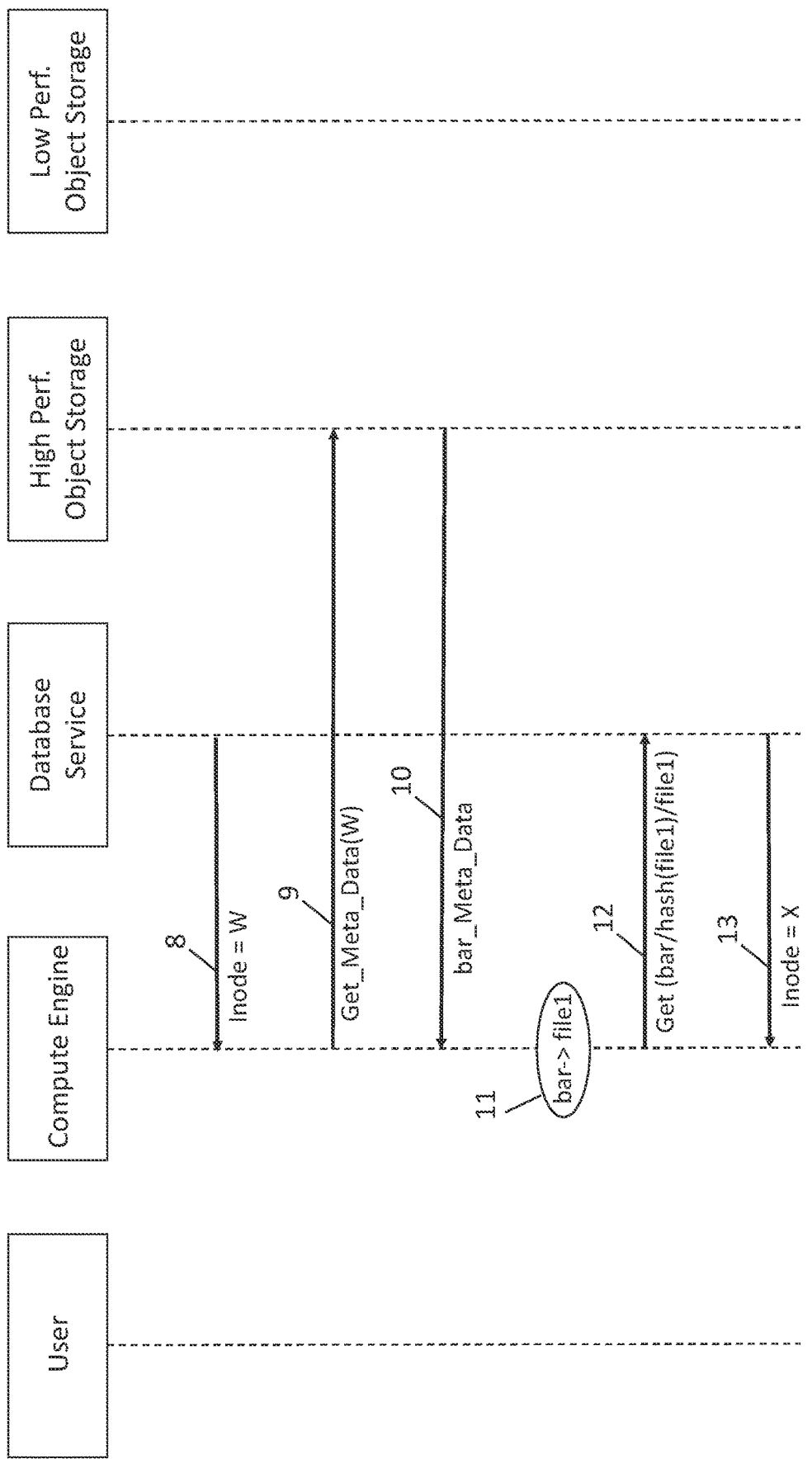
Figure 3C:
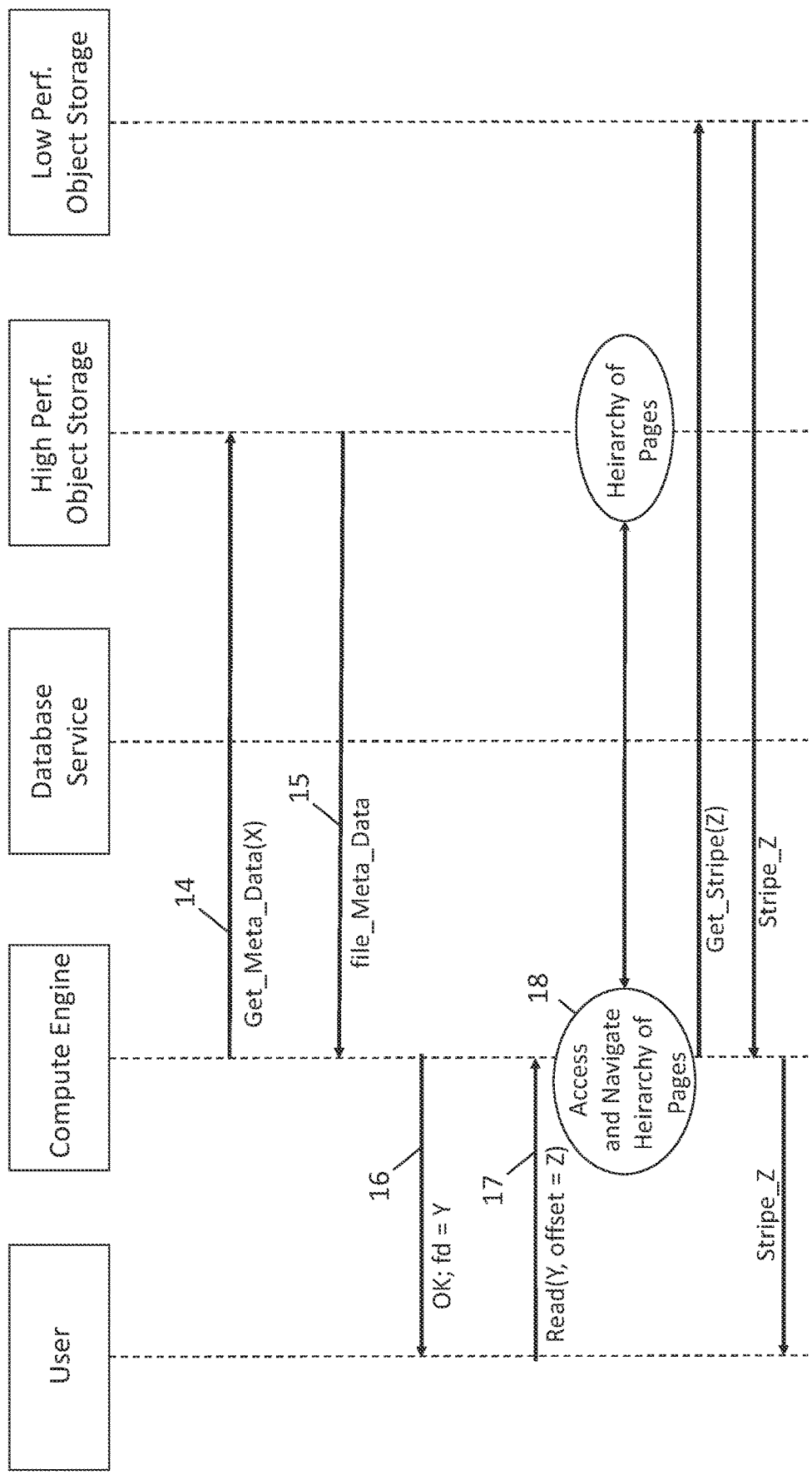

FIGS. 3a, 3b and 3c depict any embodiment of a method for accessing a storage system as described above. Initially a user 300 (such as a corporate entity or individual) sends 1 a request having a filepath "A/foo/bar/file1". Here, the user is attempting to access a file (file1) within a folder (bar) that is within a second, higher folder (foo). The second, higher folder (foo) is underneath the main root directory (A).

The request is received by the compute engine 301. The compute engine 301, as described above, presents a file system interface to the user 300, so that, from the perspective of the user 300, the user is accessing a traditional file system. The request 1 conforms to a format/syntax that complies with the interface provided by the compute engine 301.

The compute engine 301 is capable of presenting many different filesystems to same or different users. As such, there compute engine can assign customized root addresses for each of the file systems that is presents. In the instant example, the file system "A" as defined by the user is uniquely identified in the emulated system presented by the compute engine 301 with root node "131" (requests having directory root "A" are in fact identified with root node "131" deeper in the system).

As such, the compute engine 301, in response to receiving the request 1, sends a Get command 2 to the database service 301 to receive the folder representation for the first folder specified in the filepath (foo). As such, the Get request 2 has an argument ("primary key") constructed from the internal root node and the first folder in the filepath (131/foo). Here, in an embodiment, Get primary keys presented to the database service 302 take the form of [(name of higher node)/(hash of name of target node)/(name of target node)].

As such, in order to emulate navigation from the higher root node 131 to the next lower folder foo, the primary key is articulated as "131/(hash(foo)/foo" where: 1) "131" is the root node of the file system and the immediately higher node of the folder foo; 2) hash(foo) is a hash operation performed on the name "foo"; and, 3) "foo" is the name of the target folder foo. Incorporating a hash into the primary key helps, e.g., avoid collisions with similarly named filepaths.

In response to the Get command, the database service 303 returns 3 the folder representation for foo which includes the inode/object ID for foo (=V). The compute engine 301, in response to its receipt of the inode for foo, sends 4 a Get request to the higher performance object storage system 303 for the meta data (main chunk) of the folder foo. The Get request specifies the just received inode (V) as the object ID for the desired main chunk.

In response to the Get request, the high performance object storage service 303 returns 5 the main chunk for foo. The compute engine 301 can then update any meta data in the main chunk as appropriate and write back to the higher performance object storage system 303 (not depicted for illustrative ease).

Having navigated through the first nodal hop in the filepath, the compute engine 301 constructs 6 the primary key "foo/hash(bar)/bar" so that it can request the folder representation for the next folder (bar) specified in the filepath from the database service 302. In various embodiments, the compute engine 301 maintains (e.g., in local storage and/or memory) the organized folder hierarchy (and file content of each folder) of the storage system, e.g., so that it can confirm that the specified filepath is valid (e.g., if a user deletes or adds any folder or file, the compute engine's local representation of the storage system's organization heirarchy is likewise updated).

In response to receiving the Get request 7 for the folder representation of bar, the database service returns 8 the inode (=W) for bar's main chunk. The compute engine 301, in response, sends 9 a Get request to the higher performance object storage system 303 for the meta data (main chunk) of the folder bar. The Get request specifies the just received inode (W) as the object ID for the desired main chunk.

In response to the Get request, the high performance object storage service 303 returns 10 the main chunk for bar. The compute engine 301 can then update any meta data in the main chunk as appropriate and write back to the higher performance object storage system 303.

Having navigated through the first nodal hop in the filepath, the compute engine 301 constructs 11 the primary key "bar/hash(file1)/file1" so that it can request 12 the file representation for the target file (file1) specified in the filepath from the database service 302.

In response to the Get command, the database service 303 returns 13 the file representation for file1 which includes the inode/object ID for file1 (=X). The compute engine 301, in response to its receipt of the inode for file1, sends 14 a Get request to the higher performance object storage system 303 for the meta data (main chunk) of file1. The Get request 14 specifies the just received inode (X) as the object ID for the desired main chunk. The high performance object storage system 303 returns 15 the main chunk for file1.

In response to the receipt of the file's main chunk, the compute engine 301 sends 16 a response to the user 300 that includes a file descriptor (fd=Y) for file 1. The user 300 then sends 17 the compute engine 301 the file descriptor and corresponding offset (=Z) to identify a particular stripe of file1 as per nominal sparse file accessing protocols.

Importantly, along with a file's nominal attributes, in an embodiment, the main chunk for file1 that was returned 15 by the high performance object storage system 303 also includes an object ID for the root page of the sparse file's hierarchy of pages.

The compute engine 301 presents the object ID of the root page to the high performance object storage system which returns the root page, and, the compute engine proceeds to navigate through the hierarchy of pages 18.

Here, each higher page contains objectIDs for next lower pages. The compute engine 301 identifies the object ID on a higher page for the correct next lower page that leads to the targeted stripe, and, sends the object ID to the high performance object storage system 303 which returns the requested page. The process continues until the leaf page is reached having objects IDs for various stripes including the targeted stripe. The compute engine 301 selects the object ID for the targeted stripe (=Z) and sends 19 a Get stripe request to the low performance object storage system 304 which returns the requested stripe.

Notably, in the above discussion, the terms "inode" and "object ID" were used interchangeably when referring to files or folders because the inode of a file/folder could be directly used to fetch the meta data for the file/folder from the high performance object storage system. By contrast, note that only object IDs (and not inodes) were mentioned in the immediately above discussion in relation to the hierarchy of pages for a sparse file and for the stripes themselves.

Here, the term "inode" has traditionally been used to refer to the meta data for a file or folder. Because the object ID that is applied to the high performance object storage system for a file or folder returns the meta data for the file or folder, it could likewise also be referred to as an "inode".

By contrast, in an embodiment, because meta data is not kept for stripes individually, neither the object IDs used to fetch the stripes from the low performance object storage system nor the object IDs used to fetch the hierarchy of pages from the high performance object storage system are referred to as "inodes" (only object IDs).

In further embodiments, the meta data for files and folders can be made accessible to users of the storage system, whereas, the hierarchy of pages are kept internal to the storage system.

In further embodiments, each time a folder or file representation is obtained from the database, the compute engine service confirms that the request has permission to access the folder or file (e.g., standard POSIX user ID and group ID permission check(s) is/are performed).

Notably, any number of users can be granted access to a particular directory file system that is implemented with the different cloud services as described above, including, e.g., concurrent and/or parallel access to the same directory by different users (e.g., so long as their file paths do not collide, which the compute engine can monitor and control).

4. Embodiment of Snapshot Method

Figure 4A:
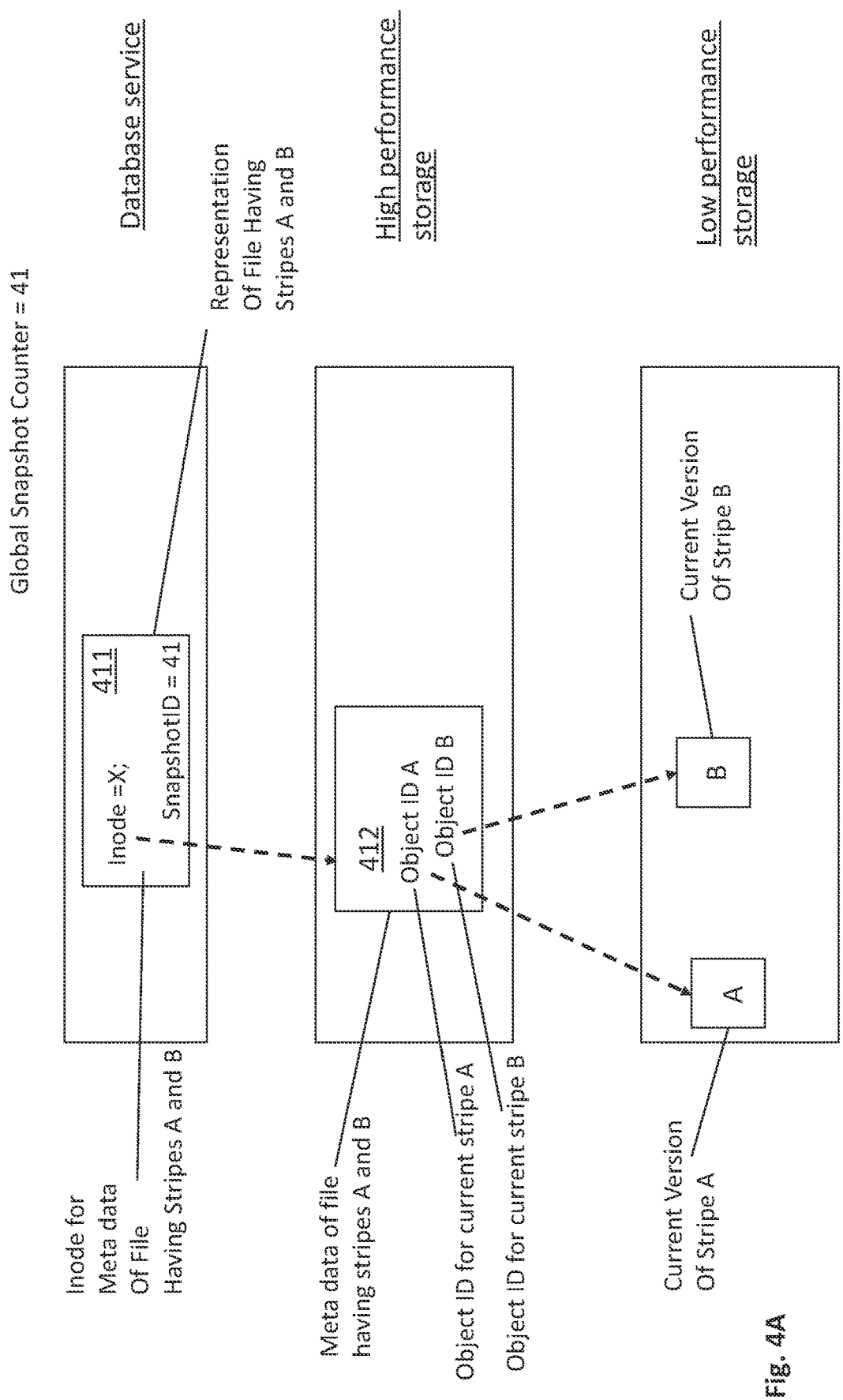
FIGS. 4a, 4b, 4c, 4d and 4e show depict a snapshot process performed on the storage system of FIG. 2.

FIGS. 4*a* through 4*e* depict a method for taking a snapshot of a file system implemented on a storage system that operates as described above. FIG. 4*a* shows an initial state of a sparse file implementation with the storage system. For illustrative ease, the folder that contains the sparse file, and any higher level folders are not depicted (they are discussed at the end of the present description, however).

FIG. 4a shows an initial state of the sparse file implementation. Consistent with the above teachings, the database cloud service contains a representation 411 of the file that includes an inode (object ID) for the file's meta data 412 within the higher performance object storage system. The file's meta data 412 includes objectIDs for individual stripes A, B of the sparse file (e.g., on a leaf page of the sparse file's hierarchy of pages).

As observed in FIG. 4a the file representation 411 includes a snapshot level (=41) that is equal to the storage system's "global" snapshot level. As will be more clear in the following discussion, when the snapshot level of a folder or file is the same as the file system's global snapshot level, modifications (e.g., deletions/additions/modifications made to folders/files/stripes) can be exercised within the storage system without concern of preserving previous information/state. That is, the state prior to the change need not be preserved. As such, any changes made to the file while the global snapshot level retains a value of 41 can be made without regard for the file's previous state.

Figure 4B:
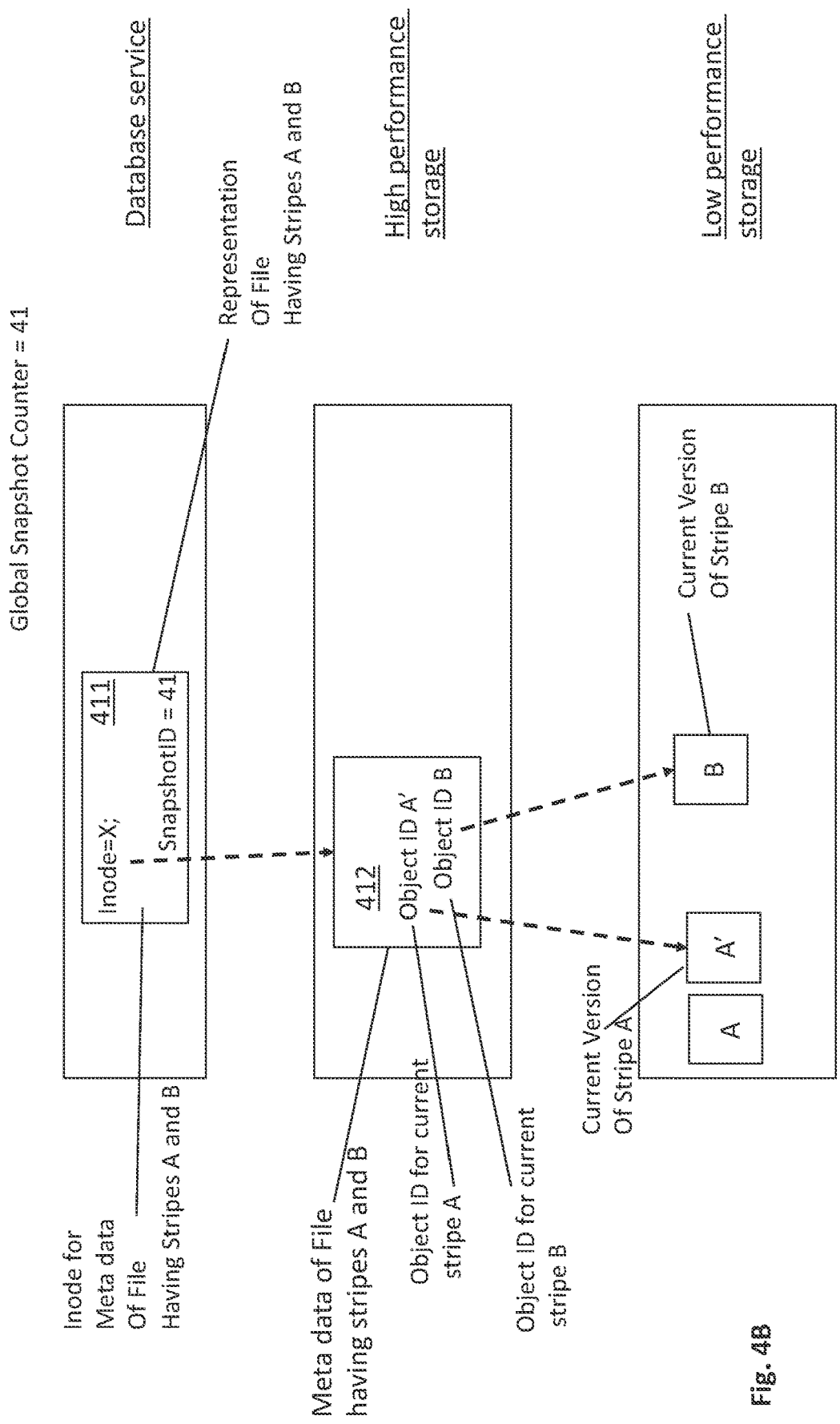

FIG. 4b shows the file state after a first change is made to stripe A. Here, as described above, in an embodiment, the objects of the lower object storage system are immutable (objects cannot be overwritten with new information). As such, in order to effect a modification to stripe A, a new object is created in the lower performance object storage system A' that is a copy of A but incorporates the change made to A. The meta data for the file 412 is updated to include a new object ID that corresponds to the object ID for A' rather than A. The snapshot level remains at 41. As such, object A in the low performance object storage system can be marked for soft deletion (and/or flagged as "not present").

Figure 4C:
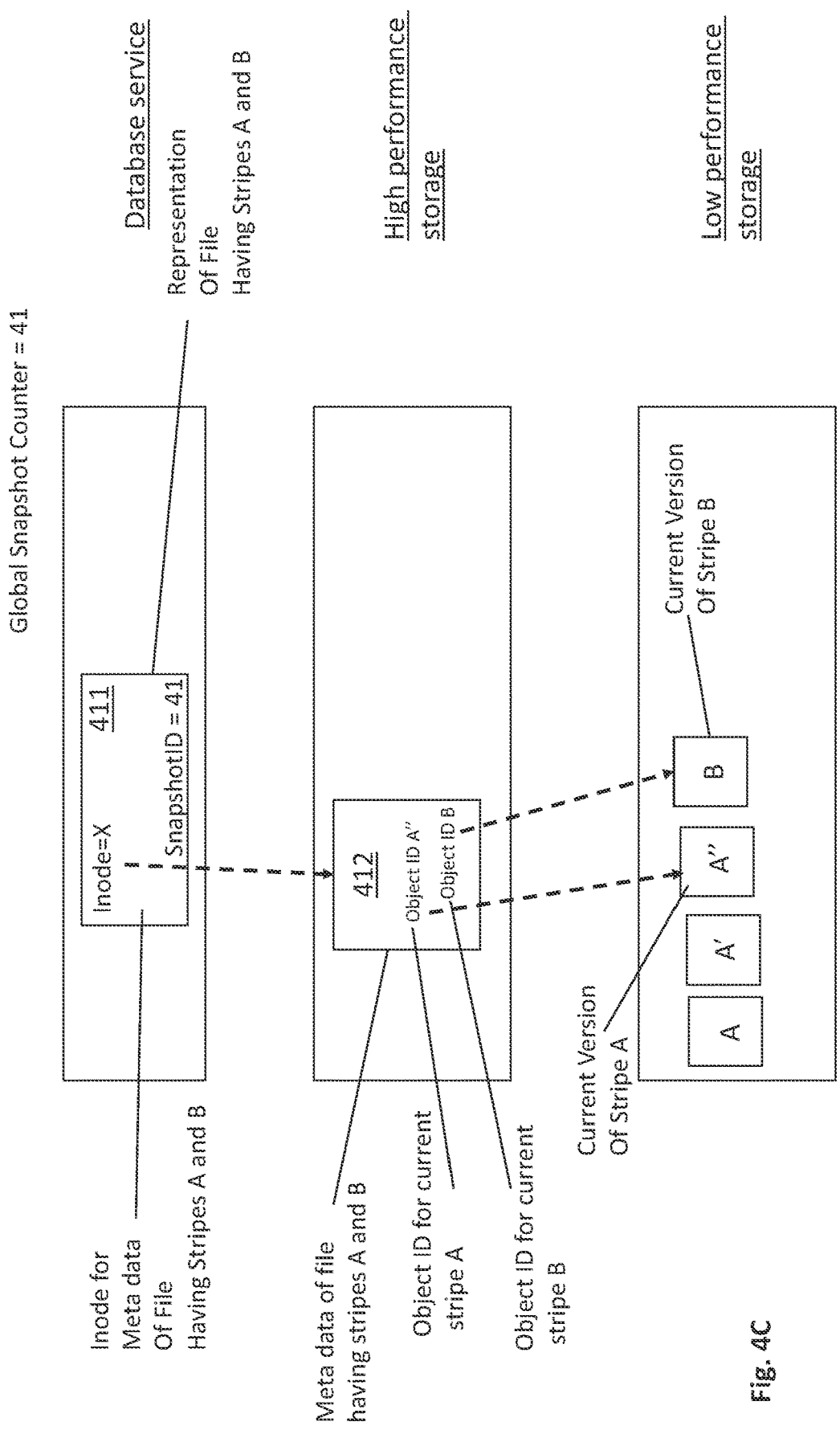

FIG. 4c shows the file state after a second change is made to stripe A. As such, another new object A" is created in the lower performance object storage system that is a copy of A' but includes the new change made to stripe A. Again, the meta data 412 for the file is updated to include a new object ID that corresponds to the object ID for A" rather than A'. The snapshot level remains at 41, thus object A' in the low performance object storage system can be marked for soft deletion (and/or flagged as "not present").

Figure 4D:
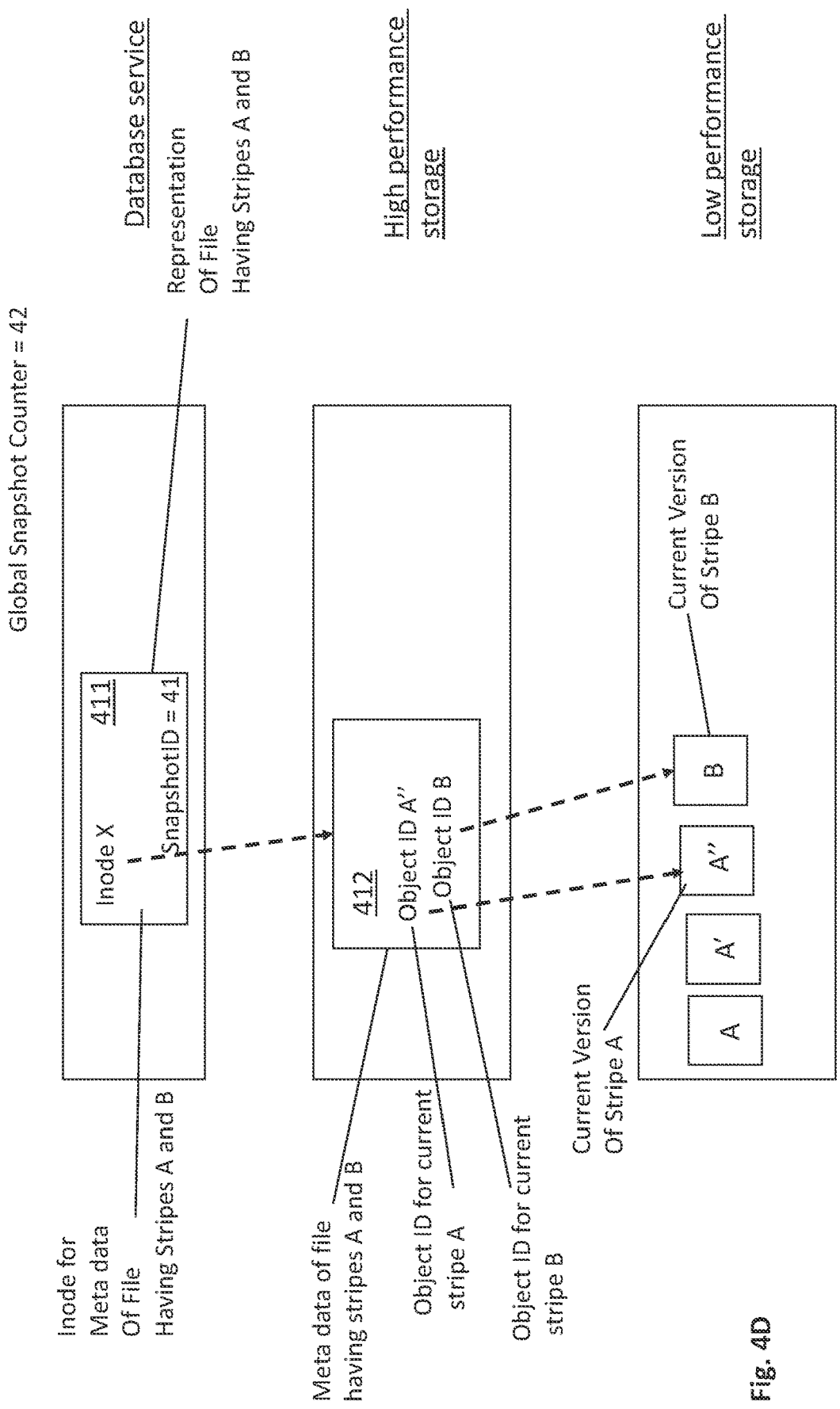

FIG. 4d shows that a snapshot of the file system has been taken (global snapshot now=42) when the state of the file has remained as in FIG. 4c. Because the snapshot level of the file representation (=41) is different than the current snapshot level (=42), a next change to the file will trigger preserving the file's state so that the state of the file system as it existed when the snapshot of FIG. 4d was taken is preserved.

Figure 4E:
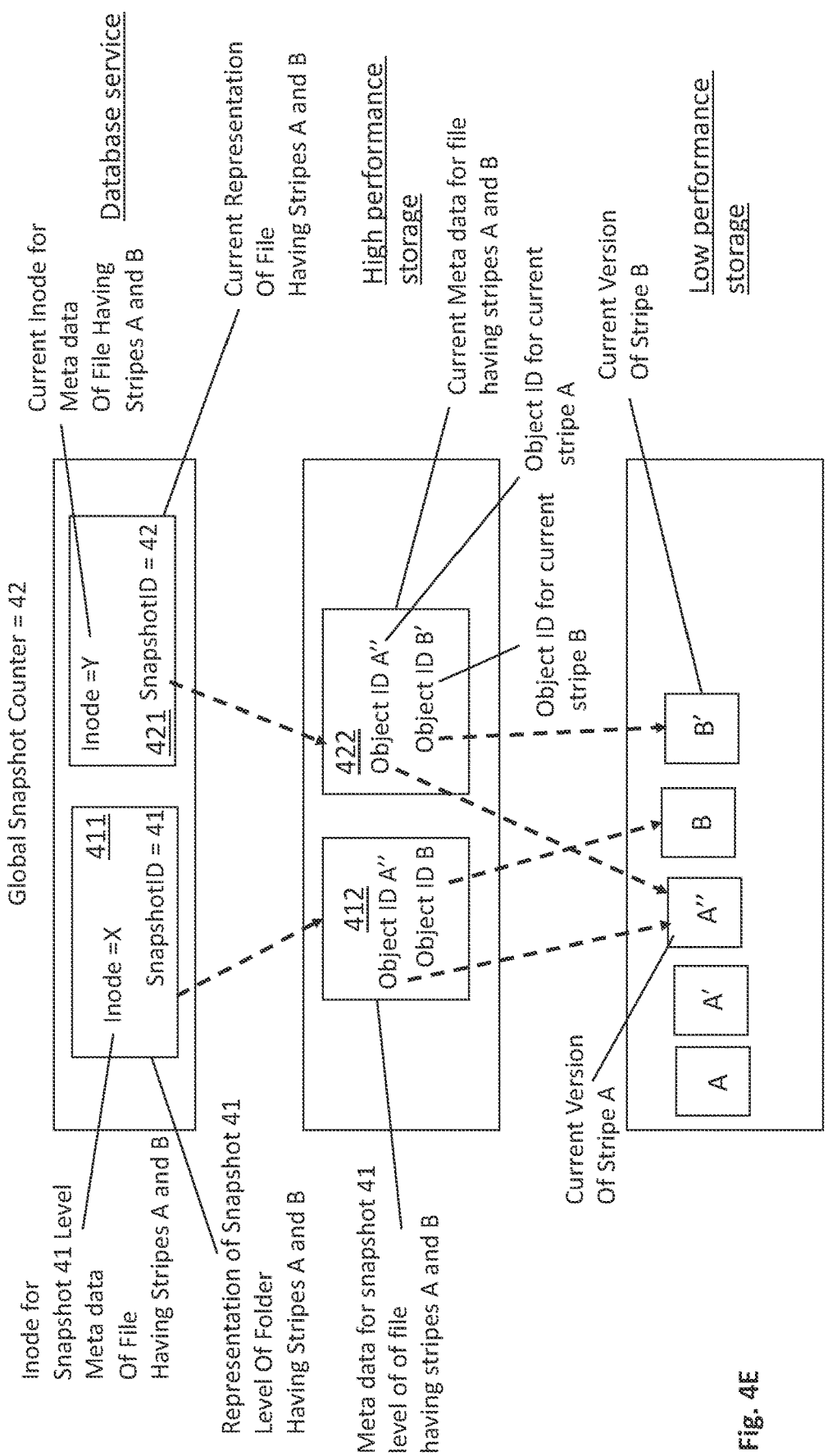

FIG. 4e shows the file after the first change made to the file after the snapshot was taken. Here, as can be seen in FIG. 4e, a second file representation 421 is created in the database service that becomes the current or "active" representation of the file. The new file representation includes a new object ID (=Y) that corresponds to the object ID for a new meta data main chunk 422 for the file in the high performance object storage system. Here, the versioning capability of the high performance object storage system is utilized to create a new version 422 of the main chunk from the old version of the main chunk 421.

The new main chunk 422 reflects the change made to the file that triggered the snapshot preservation actions. In particular, with the change being a change made to stripe B, the new main chunk 422 includes a new object ID for stripe B that corresponds to an object ID for a new object ID (B') that has been newly created in the low performance object storage system consistent with the operations described in FIGS. 4b and 4c. As such, file representation 421 and main chunk 422 correspond to the current state of the file and are used for subsequent nominal accesses to the file (that are not requests to access a previous snapshotted state of the file)

The earlier representation of the file 411, the earlier main chunk 412 and objects A" and B correspond to the state of the file when the snapshot was taken (FIG. 4d) and are preserved in the system. The state of the file as it existed when the snapshot was taken can therefore be easily accessed by using file representation 411 rather than file representation 412. Here, by labeling the file representations 411, 412 with their appropriate snapshot level, any prior snapshot level or current file state can be readily accessed.

Here, again, to obtain the current state of the file, the file representation with the highest snapshot level is used (one or more snapshots can be taken in the future over which no changes to the file are made resulting in a highest file representation snapshot level that is less than the current snapshot level). By contrast, if a particular snapshot level is desired, the file representation having a snapshot level that is the closest to the desired snapshot level (without being greater than the desired snapshot level) is utilized.

In various embodiments, the primary key that is submitted to the database service for a particular snapshot level includes the desired snapshot level (along with the primary key as described above), and, the database service includes logic that returns the representation that is closest to the desired snapshot level without exceeding the desired snapshot level.

In various embodiments, snapshots of folders are handled similarly as described just above. That is, a folder's representation includes an inode for a particular main chunk that contains the folder's meta data. The folder's representation also includes a snapshot level. Upon a first change to a folder after a snapshot is taken, the folder's representation in the database service is preserved and a new (current) folder representation is created.

Likewise, the folder's main chunk in the high performance object storage system is preserved and a new version of the main chunk is created in the high performance object storage system. The preserved folder representation includes its original inode that points to the preserved main chunk. The newly created folder representation includes an inode that points to the newly created main chunk which reflects the change made to the folder that triggered the snapshot activity.

In further embodiments, the folder and file representations include a tombstone flag (not depicted). A tombstone flag indicates whether or not the represented folder/file was deleted, and, if so, what the global snapshot value was when the item was deleted. Here, the item will be available/preserved for any access that corresponds to an earlier snapshot but will not be available for any access that corresponds to the snapshot value or later.

As mentioned above in section 2, the immutable and soft delete characteristics of the files and stripes within the lower performance object storage system allows for an effective form of versioning of the files and stripes support the snapshot feature (older versions needed for a snapshot are not soft deleted). In other embodiments, the lower performance object storage system can implement versioning and/or the higher performance object storage system is an immutable storage system with soft deletes to effect versioning to support snapshots.

5. Closing Comments

Figure 5:
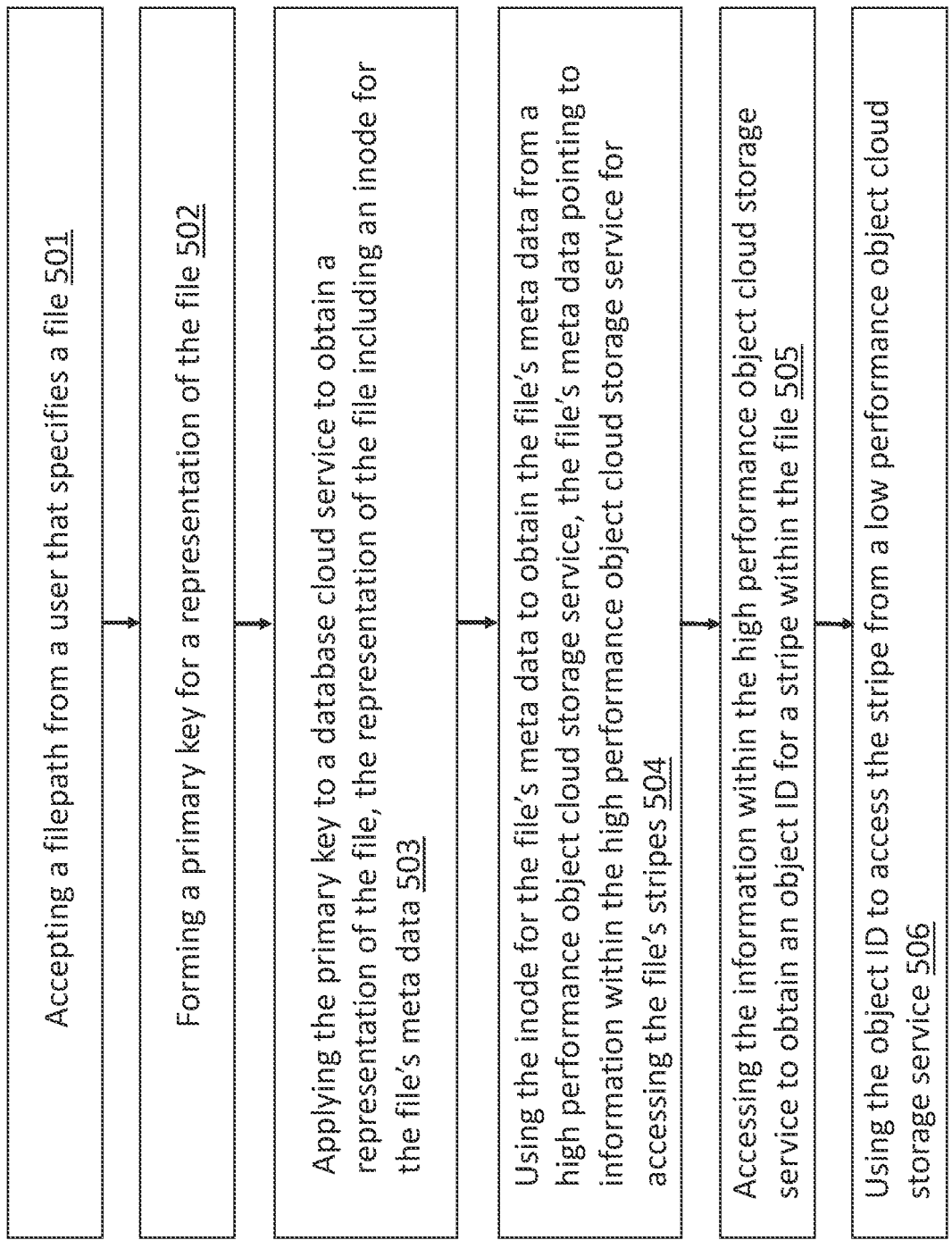
FIG. 5 shows a method performed by the storage system of FIG. 2

FIG. 5 shows a method described above. The method includes accepting 501 a filepath from a user that specifies a file. The method includes forming 502 a primary key for a representation of the file. The method includes applying 503 the primary key to a database cloud service to obtain a representation of the file, the representation of the file including an inode for the file's meta data. The method includes using 504 the inode for the file's meta data to obtain the file's meta data from a high performance object cloud storage service, the file's meta data pointing to information within the high performance object cloud storage service for accessing the file's stripes. The method includes accessing 505 the information within the high performance object cloud storage service to obtain an object ID for a stripe within the file. The method includes using 506 the object ID to access the stripe from a low performance object cloud storage service.

Figure 6:
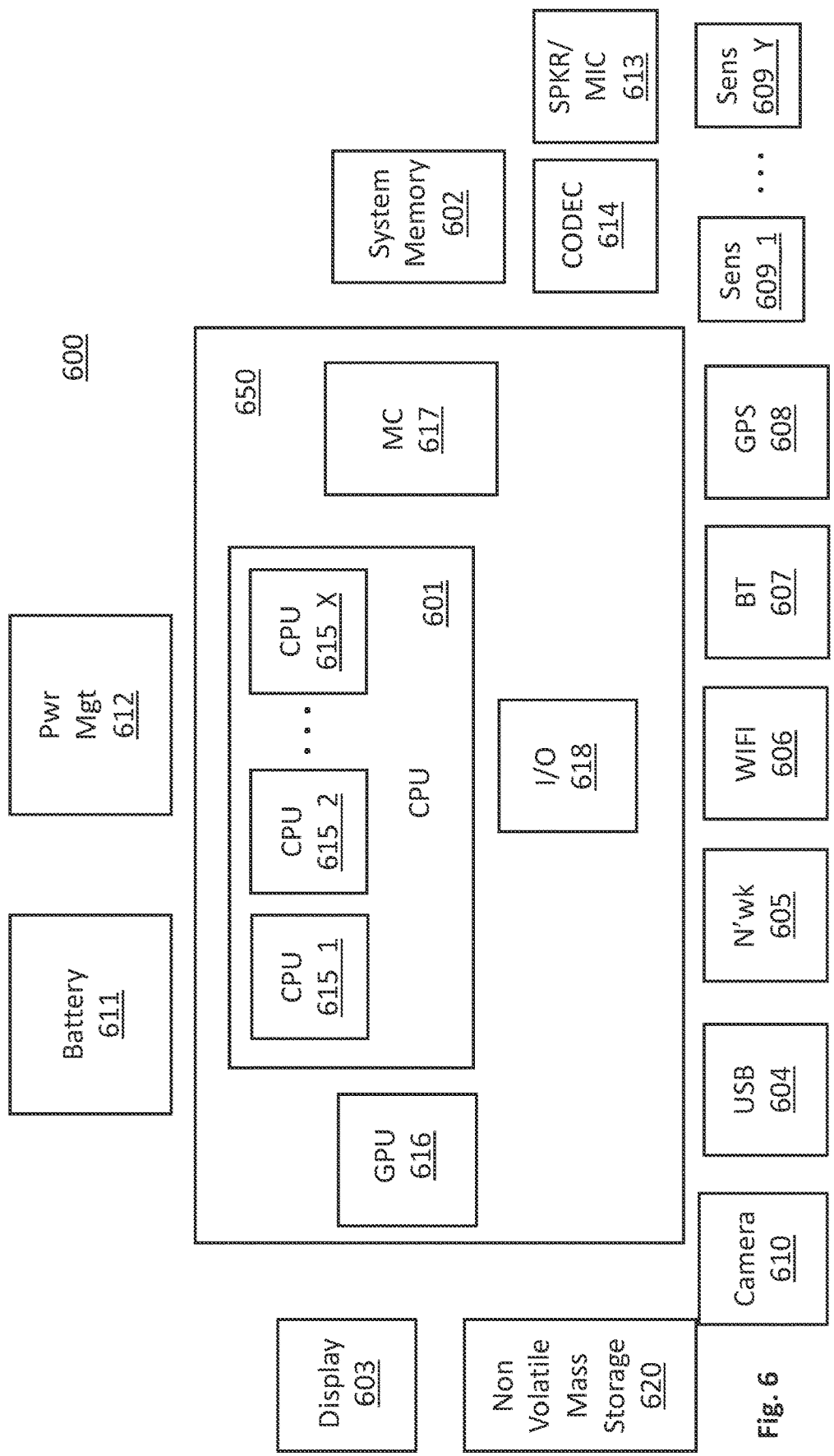
FIG. 6 shows a computing system.

FIG. 6 provides an exemplary depiction of a computing system 600. Any of the aforementioned cloud services can be constructed, e.g., from networked clusters of computers having at least some of the components described below and/or networked clusters of such components.

As observed in FIG. 6, the basic computing system 600 may include a central processing unit (CPU) 601 (which may include, e.g., a plurality of general purpose processing cores 615_1 through 615_X) and a main memory controller 617 disposed on a multi-core processor or applications processor, main memory 602 (also referred to as "system memory"), a display 603 (e.g., touchscreen, flat-panel), a local wired point-to-point link (e.g., universal serial bus (USB)) interface 604, a peripheral control hub (PCH) 618; various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a main memory controller 617 and a peripheral control hub (PCH) 618 (also referred to as I/O controller and the like). The general purpose processing cores 615 typically execute the operating system and application software of the computing system. The graphics processing unit 616 typically executes graphics intensive functions to, e.g., generate graphics information that is presented on the display 603. The main memory controller 617 interfaces with the main memory 602 to write/read data to/from main memory 602. The power management control unit 612 generally controls the power consumption of the system 600. The peripheral control hub 618 manages communications between the computer's processors and memory and the I/O (peripheral) devices.

Each of the touchscreen display 603, the communication interfaces 604-607, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650. The computing system also includes non-volatile mass storage 620 which may be the mass storage component of the system which may be composed of one or more non-volatile mass storage devices (e.g. hard disk drive, solid state drive, etc.). The non-volatile mass storage 620 may be implemented with any of solid state drives (SSDs), hard disk drive (HDDs), etc.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard interconnected logic circuitry (e.g., application specific integrated circuit (ASIC) logic circuitry) or programmable logic circuitry (e.g., field programmable gate array (FPGA) logic circuitry, programmable logic device (PLD) logic circuitry) for performing the processes, or by any combination of program code and logic circuitry.

Elements of the present invention may also be provided as a machine-readable storage medium for storing the program code. The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions. The program code is to be executed by one or more computers.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
    a storage system, comprising:
        a compute engine cloud service that interfaces with a database cloud service, a high performance object storage cloud service and a low performance object storage cloud service, the high performance object storage cloud service having faster access than the low performance object storage cloud service, the compute engine cloud service implemented with computing hardware resources, the database cloud service, the high performance object storage cloud service and the low performance object storage cloud service each being implemented with respective storage hardware resources;
    the compute engine cloud service to perform the following:
        accept a filepath from a user that specifies a file and form a primary key for a representation of the file;
        apply the primary key to the database cloud service to obtain a representation of the file, the representation of the file comprising an inode for the file's meta data;
        use the inode for the file's meta data to obtain the file's meta data from the high performance object storage cloud service, the file's meta data pointing to information within the high performance object storage cloud service for accessing the file's stripes;

access the information within the high performance object storage cloud service to obtain an object ID for a stripe within the file; and,
use the object ID to access the stripe from the low performance object storage cloud service.

2. The apparatus of claim 1 wherein the compute engine cloud service is to perform the following:
form another primary key for a folder that is specified in the filepath and that contains the file;
apply the another primary key to the database cloud service to obtain a representation of the folder, the representation of the folder comprising an inode for the folder's meta data; and,
use the inode for the folder's meta data to obtain the folder's meta data from the high performance object storage cloud service.

3. The apparatus of claim 1 wherein the compute engine cloud service is to take a snapshot of the storage system.

4. The apparatus of claim 3 wherein the high performance object storage cloud service supports versioning.

5. The apparatus of claim 3 wherein the representation of the file contains a snapshot value.

6. The apparatus of claim 3 wherein, in order to take the snapshot of the storage system, the compute engine cloud service is to:
preserve the representation of the file in the database cloud service;
create a new representation of the file in the database cloud service that is to include changes made to the file after the snapshot is taken;
preserve the file's meta data in the high performance object storage cloud cloud service; and,
create a new version of the file's meta data in the high performance object storage cloud cloud service that is to include changes made to the file's meta data.

7. The apparatus of claim 6 wherein the compute engine cloud service is to perform the following:
form another primary key for a folder that is specified in the filepath and that contains the file;
apply the another primary key to the database cloud service to obtain a representation of the folder, the representation of the folder comprising an inode for the folder's meta data; and,
use the inode for the folder's meta data to obtain the folder's meta data from the high performance object storage cloud service.

8. The apparatus of claim 7 wherein, in order to take a snapshot of the storage system, the compute engine cloud service is to:
preserve the representation of the folder in the database cloud service;
create a new representation of the folder in the database cloud service that is to include changes made to the folder after the snapshot is taken;
preserve the folder's meta data in the high performance object storage cloud service; and,
create a new version of the folder's meta data in the high performance object storage cloud service that is to include changes made to the folder's meta data.

9. A method of implementing a storage system, comprising:
accepting a filepath from a user that specifies a file;
forming a primary key for a representation of the file;
applying the primary key to a database cloud service to obtain a representation of the file, the representation of the file comprising an inode for the file's meta data;
using the inode for the file's meta data to obtain the file's meta data from a high performance object storage cloud service, the file's meta data pointing to a hierarchy of pages within the high performance object storage cloud service for accessing the file's stripes;
navigating through the hierarchy of pages to obtain an object ID for a stripe within the file; and,
using the object ID to access the stripe from a low performance object storage cloud service.

10. The method of claim 9 further comprising:
forming another primary key for a folder that is specified in the filepath and that contains the file;
applying the another primary key to the database cloud service to obtain a representation of the folder, the representation of the folder comprising an inode for the folder's meta data; and,
using the inode for the folder's meta data to obtain the folder's meta data from the high performance object storage cloud service.

11. The method of claim 9 further comprising taking a snapshot of the storage system.

12. The method of claim 11 wherein the high performance object storage cloud service supports versioning.

13. The method of claim 11 wherein the representation of the file contains a snapshot value.

14. The method of claim 11 wherein the taking of the snapshot further comprises:
preserving the representation of the file in the database cloud service;
creating a new representation of the file in the database cloud service that is to include changes made to the file after the snapshot is taken;
preserving the file's meta data in the high performance object storage cloud service; and,
creating a new version of the file's meta data in the high performance object storage cloud cloud service that is to include changes made to the file's meta data.

15. The method of claim 14 further comprising:
forming another primary key for a folder that is specified in the filepath and that contains the file;
applying the another primary key to the database cloud service to obtain a representation of the folder, the representation of the folder comprising an inode for the folder's meta data; and,
using the inode for the folder's meta data to obtain the folder's meta data from the high performance object storage cloud service.

16. The method of claim 15 further comprising, in order to take the snapshot of the storage system, performing the following:
preserving the representation of the folder in the database cloud service;
creating a new representation of the folder in the database cloud service that is to include changes made to the folder after the snapshot is taken;
preserving the folder's meta data in the high performance object storage cloud service; and,
creating a new version of the folder's meta data in the high performance object storage cloud service that is to include changes made to the folder's meta data.

17. The method of claim 9 wherein the method is performed by a compute cloud engine service.

18. A non-transitory machine readable storage medium to store program code, the program code to perform a method for implementing a storage system when executed by one or more computers, the method comprising:

> accepting a filepath from a user that specifies a file;
> forming a primary key for a representation of the file;
> applying the primary key to a database cloud service to obtain a representation of the file, the representation of the file comprising an inode for the file's meta data;
> using the inode for the file's meta data to obtain the file's meta data from a high performance object storage cloud service, the file's meta data pointing to information within the high performance object storage cloud service for accessing the file's stripes;
> accessing the information within the high performance object storage cloud service to obtain an object ID for a stripe within the file; and,
> using the object ID to access the stripe from a low performance object storage cloud service.

19. The machine readable storage medium of claim 18 wherein the method is performed by a compute engine cloud service.

20. The machine readable storage medium of claim 18 wherein the method further comprises performing the following to take a snapshot of the storage system:

> preserving the representation of the file in the database cloud service;
> creating a new representation of the file in the database cloud service that is to include changes made to the file after the snapshot is taken;
> preserving the file's meta data in the high performance object storage cloud service; and,
> creating a new version of the file's meta data in the high performance object storage cloud service that is to include changes made to the file's meta data.

* * * * *

UNITED STATES PATENT AND TRADEMARK OFFICE
CERTIFICATE OF CORRECTION

PATENT NO. : 12,124,417 B2
APPLICATION NO. : 17/156261
DATED : October 22, 2024
INVENTOR(S) : Giorgio Regni, Vianney Rancurel and Nicolas Trangez It is certified that error appears in the above-identified patent and that said Letters Patent is hereby corrected as shown below:

In the Claims

Amend Claim 6: "preserve the file's meta data in the high performance object storage cloud cloud service; and, create a new version of the file's meta data in the high performance object storage cloud cloud service that is to include changes made to the file's meta data." to read preserve the file's meta data in the high performance object storage cloud service; and, create a new version of the file's meta data in the high performance object storage cloud service that is to include changes made to the file's meta data.

Amend Claim 14: "creating a new version of the file's meta data in the high performance object storage cloud cloud service that is to include changes made to the file's meta data." to read creating a new version of the file's meta data in the high performance object storage cloud service that is to include changes made to the file's meta data.

Signed and Sealed this
Tenth Day of December, 2024

Katherine Kelly Vidal
*Director of the United States Patent and Trademark Office*